United States Patent [19]

Schafer

[11] Patent Number: 4,899,452

[45] Date of Patent: Feb. 13, 1990

[54] STEPPING STAFF

[76] Inventor: Richard J. Schafer, 12 Roberts St., Frankston, Australia

[21] Appl. No.: 259,566

[22] PCT Filed: Feb. 17, 1987

[86] PCT No.: PCT/AU87/00042
§ 371 Date: Jul. 12, 1988
§ 102(e) Date: Jul. 12, 1988

[87] PCT Pub. No.: WO87/05387
PCT Pub. Date: Sep. 11, 1987

[30] Foreign Application Priority Data

Mar. 6, 1986 [AU] Australia .............................. PH04936

[51] Int. Cl.$^4$ ............................................. G01C 15/00
[52] U.S. Cl. .......................................... 33/296; 33/809
[58] Field of Search ................ 33/293, 809, 296, 294, 33/295, 821; 285/302, 303; 248/359.4, 354.5, 354.6

[56] References Cited

U.S. PATENT DOCUMENTS 2,685,353 8/1954 Caskie ........................ 248/354.5 X

FOREIGN PATENT DOCUMENTS 1121346 4/1956 France ............................. 285/303
143834 1/1954 Sweden ............................. 33/296

Primary Examiner—Harry N. Haroian
Attorney, Agent, or Firm—Biebel, French & Nauman

[57] ABSTRACT

A stepping staff is disclosed which comprises a plurality of sections coupled together in telescoping manner. A sighting target is arranged on the uppermost section. The sections have a plurality of sets of detents with which collars are engaged. The collars enable the sections to be rotated relative to one another to bring a corresponding set of detents on the sections into alignment with one another. The collars have engaging members which locate in detents in the set of detents and enable the sections to be moved relative to one another and to the section by an integral number of distances corresponding to the spacing of the detents in the set of detents by locating the engaging members in appropriate detents in the set of detents.

12 Claims, 4 Drawing Sheets

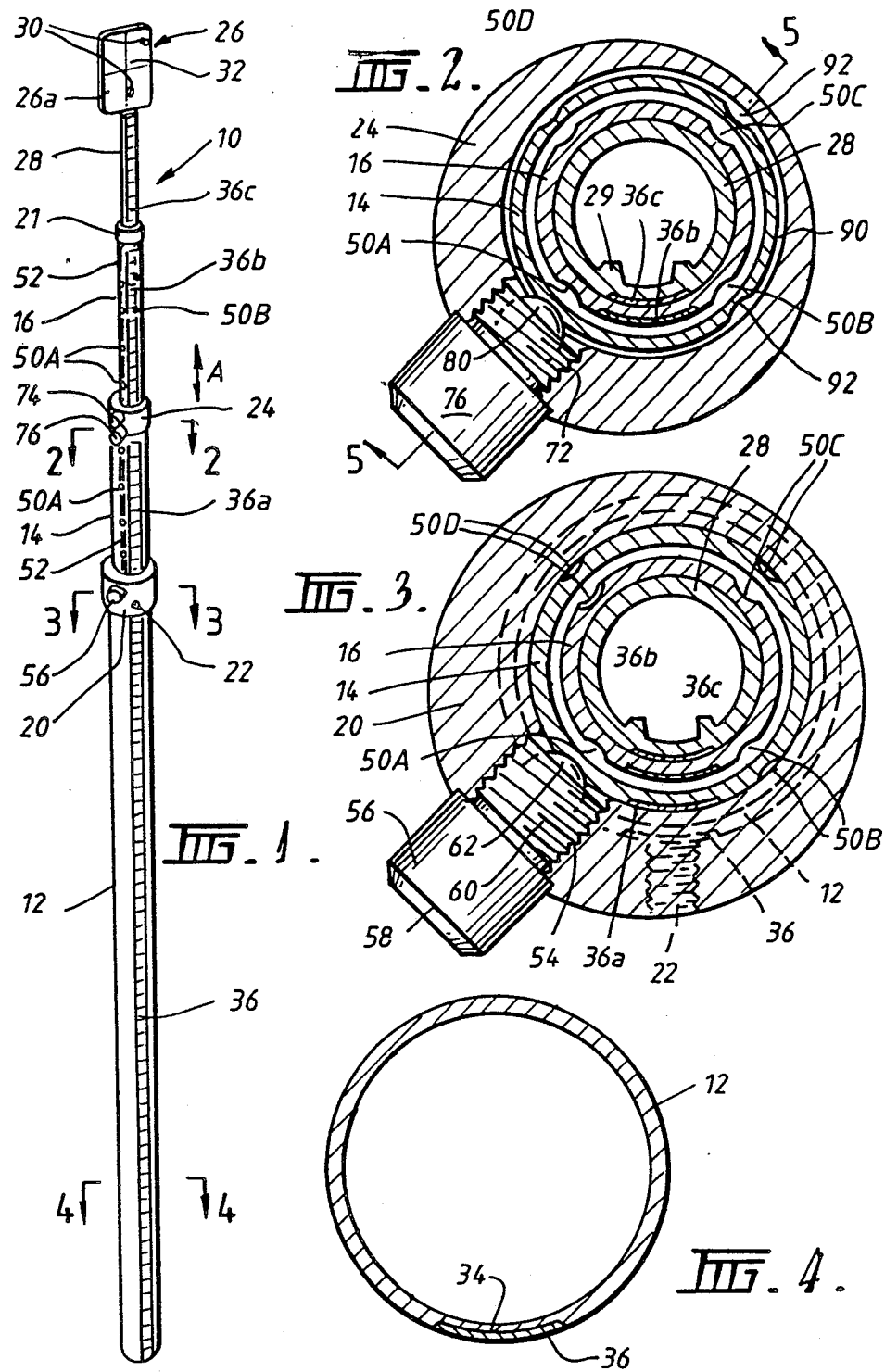

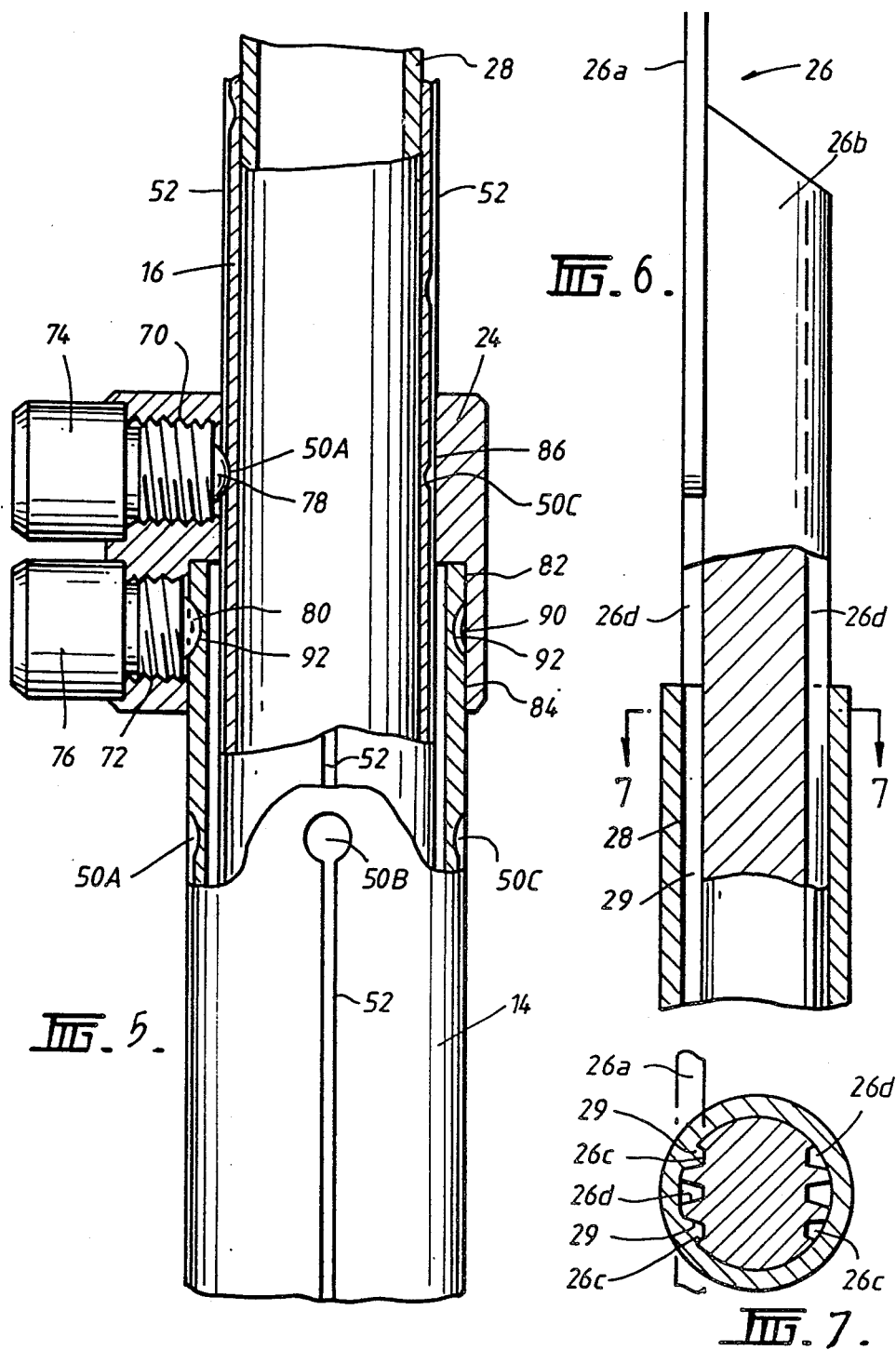

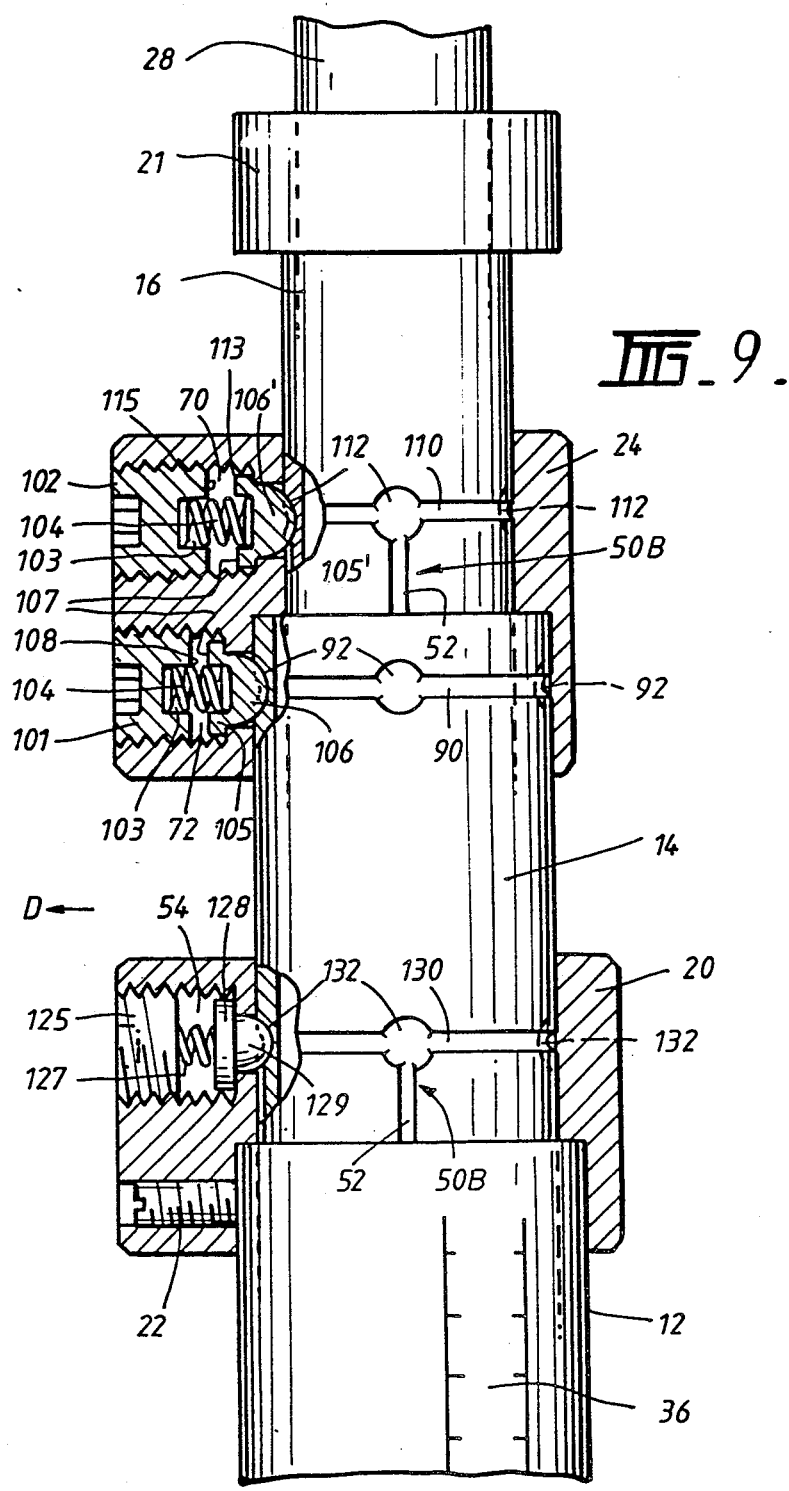

STEPPING STAFF

This invention relates to a stepping staff and in particular to a brick stepping course rod to enable height references for brick work to be made and to a surveying staff to enabling measurements to be taken in building work.

Conventional surveying staffs commonly used to enable height reference to be taken during the formation of brick work or in other building work require a surveyor or other trained person to make an initial reading using an optical level and thereafter workmen are required to take measurements from the staff by inspecting gradations formed on the staff. Conventional surveying staffs therefore suffer from the problem that it is often necessary for untrained people to read a staff which can result in errors in measurements being made.

The object of this invention is to provide a stepping staff which can easily be used by untrained personnel and therefore result in a lower likelihood of errors being made whilst taking measurements.

The invention may be said to reside in a stepping staff, said stepping staff having a plurality of sections coupled together for movement relative to one another, one of said sections having a sighting target, at least one of said plurality of said sections having a set of coupling means, and an adjacent one of the sections having engaging means for engaging with one of the coupling means in the set, each coupling means in the set of coupling means being spaced apart by a prescribed distance such that upon relative movement of the at least one section and adjacent section one coupling means on the at least one section can be coupled with the engaging means on the adjacent section.

The invention also provides a stepping staff having a plurality of sections coupled together for telescopic movement relative to each other, a first section of said plurality of sections having a first collar mounted thereon, a second section of said plurality of sections having a plurality of sets of substantially vertically aligned engaging members spaced about said second section, said first collar supporting a coupling member which is engagable with an engaging member in anyone of said sets of engaging members, said second section being rotatable about its longitudinal axis relative to said first collar so that any one of the engaging members can be brought into engagement with said engaging member in one of the sets of engaging members, and said first and second sections can be telescopically moved relative to one another to locate the first coupling member in another of the engaging members in said one of said sets to adjust the height of the stepping staff by an incremental distance.

Accordingly, relative measurements can be made with the stepping staff of this invention by simply moving one of the sections relative to the other of the sections so that a coupling means on one of the sections is coupled with an engaging means on the other of the sections. Since the coupling means are spaced by a predetermined distance the coupling of one of the coupling means with the engaging means upon relative movement of the staff means that the height of the staff has been altered by the spacing between the coupling means or by a number of times that distance if the sections are moved relative to the other such that the engaging means on one of the sections moves over a number of the coupling means on the other of the sections. Thus, measurements can be made by simply moving the sections relative to one another without the need to read graduations on the staff.

Preferably, the coupling means comprises a plurality of detents formed in each section which may comprise holes drilled in the sections and the engaging means is a collar which supports a loaded ball which engages with the detents on the sections to couple the sections together.

Each section may include a plurality of sets of detents spaced apart by different prescribed distances corresponding to course heights in various type of brick work.

Preferred embodiments of the invention will be described in more detail with reference to the accompanying drawings in which:

FIG. 1 is a view of a stepping staff embodying the invention;

FIG. 2 is a cross-sectional view along the line 2—2 of FIG. 1;

FIG. 3 is a cross-sectional view along the line 3—3 of FIG. 1;

FIG. 4 is a cross-sectional view along the line 4—4 of FIG. 1;

FIG. 5 is a cross-sectional view along the line 5—5 of FIG. 2;

FIG. 6 is a view of a sighting target of the embodiment of FIG. 1;

FIG. 7 is a cross-sectional view along the line 7—7 of FIG. 6;

FIG. 9 is a view of a second embodiment of the invention.

Figure 8:
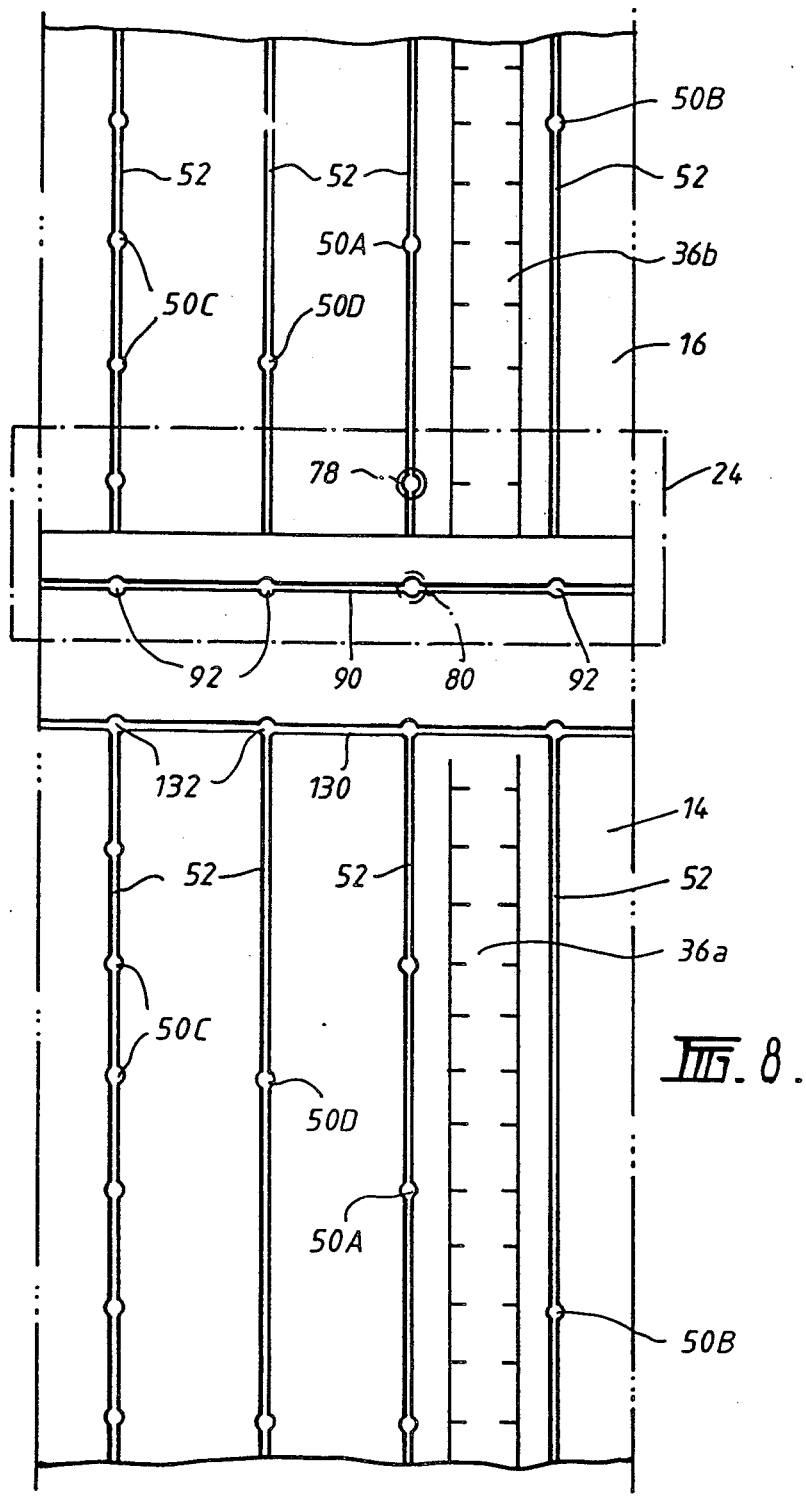
FIG. 8 is a drawn out view of part of the stepping staff of FIG. 1.

With reference to FIGS. 1 to 4 a stepping staff 10 is shown which comprises an outer hollow tubular member 12 which received an intermediate hollow tubular member 14 which in turn received an inner hollow tubular member 16. The tubular members 12, 14 and 16 can be telescoped together so that they can be extended outwardly or drawn inwardly in the direction of double headed arrow A. Mounted on the tubular section 12 is a collar 20 which is secured to the section 12 in a fixed relationship by a screw 22 which passes through an opening in the collar 20 and engages the outer wall of the section 12. The section 14 also has a collar 24. However, the collar 24 is adapted to be rotated about the section 14 in the manner to be described hereinafter.

A sighting target 26 which has a stem 28 is received in the hollow section 16. The sighting target 26 may have holes and/or pins 30 together with a cross-hair 32 to facilitate laser sighting.

The cross-section of the section 12 is circular as shown in FIG. 4. However, the outer surface of the section 12 includes a recessed portion 34 which received a measuring tape 36. The recess accommodates the measuring tape 36 so that the surface of the measuring tape 36 is flush with the remainder of the section 12 to provide a smooth finish. The cross-section of the sections 14, 16 and 28 is similar to the section 12 and further measuring tapes 36a, 36b, and 36c are received in those recesses. The recess and the flush mounting of the tapes on the sections 14, 16 and 28 enables the sections to smoothly slide together without catching or damaging the tapes.

The sections 14 and 16 each include a plurality of sets of recesses or detents 50A, 50B, 50C, and 50D. Each detent or recess in each set on a respective section 14 or 16 is vertically aligned and in the embodiment shown in the drawings four sets of detents are provided. The spacing between detents in each set is different and corresponds to the course height in brick work or to other standard heights which need to be measured in building or excavation work or the like. In the embodiment shown in the drawings the four sets of detents 50A, 50B, 50C and 50D are spaced apart 90° around the circumference of the sections 14 and 16 as is best shown in FIGS. 2 and 3. Alternatively the four sets of detents could be arranged at 30°, 150°, 210° and 330°. This allows two large spaces of 120° between detents if it is desired to use a wider tape. Other convenient arrangements of the detents could also be used.

FIG. 8 shows a drawn out view of part of the sections 14 and 16 in the vicinity of the collar 24. The view in FIG. 8 is an expanded out view as if the circular sections 14 and 16 were cut open and laid out flat so that the four sets of detents 50A, 50B, 50C, and 50D can be clearly seen. This view clearly shows the different spacing between detents in each set. FIG. 8 also clearly shows a groove 52 which joins the detents in each set of detents. It should be noted that the depth of the detents in each set is somewhat deeper than the groove 52 which joins the detents. It should also be noted that in place of detents which are a recess in the sections a hole which passes right through the sections could be used.

The collar 20 is provided with a threaded hole which receives an engaging member 56 which has a head 58 and a screw threaded shank 60. The screw threaded shank 60 is adapted to be screw threaded into the hole 54 and the shank 60 is hollow and receives a spring loaded ball 62 which projects slightly outwardly of the end of the shank 60. The ball 62 may be held in place by a reduced diameter flange at the end of the shank 60 behind which the equator or widest diameter portion of the ball is received. The spring (not shown) which is received in the shank and forces the ball outwardly also allows the ball to be pushed back into the shank against the bias of the spring.

The collar 24 is similar to the collar 20 but has two screw threaded holes 70 and 72 (see FIG. 5). Two engaging members 74 and 76 are received in the holes 70 and 72 in the same manner as the member 56 is received in the hole 54. Each of the members 74 and 76 has a spring loaded ball 78 and 80 respectively which are mounted in the members 74 and 76 in the same manner as the ball 62 is mounted in the member 56.

As is best seen in FIG. 5, the collar 24 is provided with a stepped bore 82 which extended all the way through the collar. The stepped bore has a larger diameter portion 84 which receives the section 14 and a reduced diameter portion 86 which receives the section 16. The top portion of the section 14 is provided with a circumferential groove 90 and a detent 92 is provided on the groove colinear with each of the sets of detents 50A, 50B, 50C, and 50D on the section 14. Once again the detents 92 are slightly deeper than the grooves 90 and are also of larger diameter than the width of the groove 90.

The location of the ball 80 in groove 90 will prevent vertical movement of the collar 24 relative to the section 14. However, a screw (not shown) could pass through the collar 24 and also locate in the groove 90 to assist in securing the collar 24.

Engaging member 76 is screw threaded into the hole 72 which is located so that the ball 80 is received in the groove 90 and can therefore locate in any one of the detents 92. The engaging member 74 passes through the collar 24 and the ball 78 can locate in any one of the detents in any one of the sets 50A, 50B, 50C, or 50D.

The set of detents 50A may be spaced apart by a distance of 85 mm which represents the course height in clay brickwork. The 50C may be spaced apart by a distance of 100 mm which represents the course height in masonry brickwork. The detents 50B may be spaced apart by a distance of 200 mm which represents the course height in masonry block work. The detents 50D may be spaced apart by yet a further and greater distance which represents another standard measurement or excavation work etc. In order to provide easy recognition of the sets of detents the grooves 52 may each be coloured a different colour to correspond to a particular type of brick work and to allow easy alignment of the sets on one of the sections with the sets on another of the sections.

A sighting target 26 is best shown in FIGS. 6 and 7 and comprises a sight area 26a coupled to a shaft 26b the target area 26a and shaft 26b may be coupled integrally and the upper portion of the shaft 26b has a cross-section which as is shown in FIG. 7. The cross-section of the shaft 26b includes a plurality of cut-out portions 26c and 26d on opposite sides of the shaft 26b. The upper portion of the section 28 is provided with two internal lugs 29 which are shaped to correspond with the shape of the portions 26c and are spaced apart to correspond with the spacing of the portion 26c. The sighting target 26 is therefore locked in the hollow section 28 by locating the lugs 29 in one of the pairs of recesses 26c on one side of the shaft 26b and then sliding the shaft 26b into the section 28. The recesses 26c and the lugs 29 provide a frictional fit of the shaft 26b in the section 28 which securely holds the sighting target 26 in the section 28. The height of the sighting target can be adjusted relative to the section 28 by forcing the shaft 26b further into the section 28 or drawing it outwardly of the section 28 against the frictional fit of the shaft 26b in the section 28. The provision of recesses 26 on either side of the shaft 26b enables the sighting target to be rotated an amount of 180° and reinserted into the section 28 if desired.

In order to use the stepping staff shown in FIG. 1, the stepping staff is located in a trench or relative to a course of bricks in brick work or the like by suitably supporting the staff. A surveyor or other trained workman can then use an optical sighting tool to locate the sighting target 26 at a predetermined height by moving the shaft 26b relative to the section 28 to suitable locate the sighting target 26. Once the height of the sighting target 26 has been set unskilled workman can simply adjust the height of the stepping staff in increments corresponding to the course height of bricks with which they are working or by another incremental height corresponding to the spacing of detents in one of the sets 50A to 50D. This is achieved by firstly gripping the section 12 with one hand and sliding the section 24 at least a short way out of the section 12 so that the section 14 can be rotated about the longitudinal axis of the stepping staff 10 so that the engaging member 56 is engaged in any one of the D dents in the appropriate set of detents corresponding to the measurement distance required for the relevant type of work. This is done by simply rotating the section 14 relative to the section 12 and collar 20 so that the engaging member 56 engages in one of the appropriate detents which is colour coded for easy recognition by a workman. The set of detents in the section 16 must then be aligned with the corresponding set of detents in the section 14. This is done by holding the section 16 in one hand and rotating the collar 24 relative to the section 16 so that the engaging member 74 disengages from the detent in which it is located and is rotated to locate in a detent in the set corresponding to the set of D dents with which the engaging member 56 is engaged. Rotation of the collar relative to the section 16 will cause the section 14 and the section 12 to also rotate relative to the section 16 because of the coupling of the collar to the section 14 via the engaging member 76 and its spring loaded ball 80 and the engagement of the section 14 to the section 12 via the engaging member 56 and its spring loaded ball 62. Once the engaging member 74 is located in the appropriate set of detents the section 14 is then gripped with one hand and the collar 24 is rotated relative to the section 14 to bring the set of detents with which the member 74 is engaged into vertical alignment with the set of detents with which the member 56 is engaged. Since the section 14 is gripped and the collar 24 is rotated the ball 80 will leave the detent in which it is located and ride in the groove 92 until it locates in the appropriate detent. The engagement between the collar 24 and the section 16 by virtue of the engaging member 74 and he spring loaded ball 78 will result in the section 16 rotating with the collar 24 until the set of detents with which the ball 78 is engaged is in vertical alignment with the set of detents with which the engaging member 56 is engaged.

Therefore the engaging members 56 and 74 are engaged with a detent in the same set of detents 50A, or 50B, or 50C or 50D.

In order to increase or decrease the height of the sighting target by one or more courses of bricks or by any other measurement corresponding to the distance between the detents in the appropriate set of detents with which the members 74 and 56 are engaged the sections 12 and 14 and/or the sections 16 and 14 are moved relative to one another by appropriately moving the sections in the vertical direction so that the ball 62 the engaging member 56 leaves the detent in which it is located and rides in the groove 52 corresponding to that set of detents until it locates in one of the other detents in the set of detents. The ball 78 in the engaging member 74 may ride in its groove 52 in the same manner when the sections 16 and 14 are moved relative to one another until it locates in another detents in that set of detents. By moving one of the sections relative to another of the section 16 an amount of one spacing between detents (i.e. from one detent to the next detent) the sighting target has been raised or lowered by a distance of the spacing between detents (i.e. 85 mm in the case of the set of 50A). Since the location of the ball 78 or ball 62 in a detent results when the ball moves from the groove 52 into the larger recess which defines the a distinct click is heard when the ball engages the detent. By simply moving one section relative to another section by drawing them apart or pushing them together and counting the clicks a workman can decide how many courses of brickwork or the like he has raised or lowered the sight target 26. For instance, if it is merely desired to increase the sighting target 26 by one course height then the sections are moved further apart until one click is heard. The workman then knows that the sight 26 has been increased by one course height if it is desired to increase the course height by five or ten courses to allow for a window or the like in a building then the sections are moved apart until five clicks are counted.

The length of the shaft 26b is preferably about 250 mm although other lengths could be used if desired. A length of 250 mm provides sufficient adjustment of the sighting target 26 relative to the section 28 for the initial set up of the stepping staff since in most cases maximum course height will be 200 mm and a movement of 100 mm upwardly or downwardly is sufficient to locate the sighting target 26 at a course height.

The lengths of the section 12, 14 and 16 is preferably approximately 900 mm but once again other lengths could be used if desired.

The section 28 can be locked to the section 16 by a collar 21 and detent arrangement similar to the collar 20 or the collar 24. Alternatively, the section 28 could be done away with and the shaft 26b received in the section 16.

FIG. 9 shows a second embodiment of the invention in which like reference numerals indicate like parts to those described in conjunction with the embodiments of FIGS. 1 to 8.

In the embodiment of FIG. 9 the engaging means is arranged so that the movement of the engaging means radially outwardly with respect to the sections 12, 14 and 16 is limited so that the engaging means must locate in a circmferentially extending groove in order to enable the sections to rotate relative to one another and must ride in the groove 52 when the height of the staff is being adjusted. This ensures that the sections can only be rotated when the engaging means is located in its circumferential groove so that the sections are not rotated when they are randomly positioned relative to one another and must ride in the grooves 52 when height adjustment takes place to prevent damage to the tape measure located on the sections or damage to any other markings on the sections.

As shown in FIG. 9, the collar 24 is provided with two blocks 101 and 102. In the embodiment shown in FIG. 9 the blocks 101 and 102 are screw threaded into screw threaded holes 70 and 72. However, in other embodiments the blocks 101 and 102 could be smooth sided and merely forced into smooth sided holes to be retained by friction, welding or any other means. The blocks 101 and 102 have a recess 103 which receives a spring 104. Arranged at the other end of the springs 104 is a plate 105 and 105' which have a hemispherical ball portions 106 and 106' respectively. The hemispherical ball portion 106 associated with block 101 is received in groove 90 and locatable in one of the holes 92 in the same manner as the ball described with reference to the earlier embodiment. The distance between the rear surface 107 of the plate 105 and the front surface 108 of the block 101 is such that the ball portion 106 can move in the direction arrow D a distance which prevents complete removal from the detents 92 but allows engagement in the groove 90. This limited movement of the ball portion 106 ensures that the ball portion 106 always remain within the groove 90 or a detents 92 and therefore the ball portion 106 is not only guided within the groove 90 but also prevents vertical movement of the collar 24 and the ball portion 106 from riding on other portions of the section 14.

The upper portion of the section 16 is provided with a groove 110 which is similar to the groove 90. The groove 110 joins a plurality of detents 112 which are arranged at the top of the grooves 52 in each set of detents 50A, 50B, 50C and 50D and which are deeper than the groove 110 and of larger diameter than the width of groove 110. Once again the distance between the rear surface 113 of the plate 105' associated with block 102 and the front surface 115 of block 102 is arranged such that the movement of the ball portion 106 in the direction of arrow D enables the ball portion to be moved only a sufficient distance out of the detents 112 so that it can locate in the groove 110 but not completely out of the groove 110. Therefore in this embodiment of the invention when it is desired to rotate the section 16 relative to the collar 24 and/or the section 14 it is necessary to completely telescope the sections 14 and 16 together with the ball 106' riding in a groove 52 associated with one of the sets of detents until the ball 106' is located in one of the detents 112. The section 16 may then be rotated relative to the collar 24 and/or the section 14 by gripping the collar 24 and rotating the section 16 so that the ball 106' is forced out of the detents 112 and into the groove 110. The section 16 can then be rotated until the ball 106' is located in a detents 112 which is associated with the desire one of the sets of detents 50A to 50D. The arrangement shown in FIG. 9 therefore prevents the section 16 from being rotated until the ball 106' is located in one of the detents 112. Since the section 16 can only be rotated when the staff is in this configuration, the rotation of the section 16 relative to the collar 24 does not cause the tape 36b on the section 16 to be scuffed or marked or any other markings on the section 16 to be scuffed or marked which would otherwise be the case if the section 16 is allowed to rotate in any random position of the section 16 relative to the section 14.

Since the distance between the rear wall 113 of the plate 105' and the front wall 115 of the block 102 is selected to enable the ball portion 106' to move out of a detents 112 only a sufficient distance to locate in the groove 110, the ball 106' cannot be completely removed from one of the detents in the sets 50A to 50D or the respective groove 52 and therefore the tape 36b and other markings or the section 16 are protected. The only time the ball 106' can leave one of the detents in the sets of detents 50A to 50D is when the sections 14 and 16 are telescopically moved relative to one another so that the ball 106' can be removed from one of the detents and into the groove 52 to allow relative telescopic movement of the sections 14 and 16 or when the ball 106' is located in a top detent 112.

To further secure the collar 24 to the sections 14 screws (not shown) could pass through the collar 24 and locate in the groove 90 to further secure the collar 24 against vertical movement relative to the section 14.

In the embodiment of FIG. 9 a similar arrangement to that described above is provided to allow rotation of the collar 20 relative to the section 14. To achieve this the collar 20 includes a bore 54 and a screw threaded block 125 which is similar to the blocks 101 and 102. The block 125 has a spring 127 which biases a plate 128 having a hemispherical ball portion 129. Once again an upper portion of the section 14 is provided with a groove 130 which is located somewhat below the groove 90. The groove 130 joins a series of detents 132 which are vertically aligned with each of the sets of detents 50A to 50B and which also communicate with the grooves 52 in the respective sets of detents 50A to 50B. The collar 20 functions in a similar manner to the collar 24 so that when it is desired to rotate the section 14 relative to the section 12 it is necessary to telescope the sections 14 and 12 together so that the collar 20 is arranged with the ball portion 129 located in one of the detents 132 associated with groove 130. The spacing between the block 125 and the plate 128 is such that the ball portion 129 can be removed out of the detents 132 only a distance sufficient to locate it in the groove 130 but not a distance sufficient to leave the groove 130. Therefore, the section 14 can only be rotated relative to the collar 20 and section 12 when the ball portion 129 is located in one of the detents 132 so that tape 36a or any other marking on the section 12 is not defaced by movement of the ball portion 129 over those markings or tape. When the ball portion 129 is located in one of the detents associated with the sets 50A to 50B below the detents 132 rotation of the section 14 relative to the collar 20 and section 12 cannot take place because the ball 29 cannot leave the detents in the sets 50A to 50D until the ball is located in one of the detents 132.

In other embodiments (not shown) the grooves 110 and 130 could be located at the bottom or an intermediate position of the sections 16 and 14 so that the staff must be fully or partly extended before rotation of the sections can take place. The distance between the blocks 101, 102 and 125 and the plates 105, 105' and 128 can be adjusted by screwing the blocks into or out of their respective screw threaded holes. If the blocks are to be permanently retained in place by welding or the like and they must be accurately located before they are fastened in place.

If desired the collar 20 could be arranged to rotate relative to section 12 to facilitate alignment of the tape 36. To this end a groove (not shown) could be provided in the section 12 for receiving the screw 22 (See FIG. 3) so that the collar 20 can rotate but cannot move vertically relative to the section 12.

The preferred embodiments of this invention therefore provide a stepping staff which can be used as a brick stepping course rod to measure or determine course heights for brick work and a surveying staff for general surveying purposes to measure relative heights without the need for a workman to measure actual graduations on the staff once the sighting target on the staff has been set by a surveying operation. Thus, all that is required with the present invention is for a skilled surveyor or the like to set the staff once by setting the sighting target relative to the rod 12 or 12A and then by simple movement of the rods relative to one another in view of the spacing of the detents the height of the target can be adjusted by prescribed distances corresponding to brick course heights or other desired distances which can be incorporated into the staff to enable further relative measurements to be made by unskilled workers since it is not necessary for those skilled workers to make accurate measurement readings on the staff. All that is required is for them to move the sections of the staff relative to one another to maintain a count of a number of detents which the engaging means moves over by simply counting the number of clicks which are caused each time a detent is engaged or passed during relative movement of the sections.

The locking devices may be any of the devices shown or combinations thereof or other suitable mechanisms.

The stepping staff can also be used to set a gradient for plumbing or the like by setting a first level and the moving the staff to another location, for example, 6 meters away and then moving the sections 12 and 14 or 14 and 16 relative to one another to set the gradient. One of the sets of detents could be used to set a standard gradient so that "one click" represents a gradient of 1 unit in 6 meters, "two clicks" a gradient of 2 units in 6 meters and so on.

Since modification within the spirit and scope of the invention may readily be effected by persons skilled within the art, it is to be understood that this invention is not limited to the particular embodiment described by way of example hereinabove.

I claim:

1. A stepping staff, said stepping staff having a plurality of sections coupled together for movement relative to one another, one of said sections having a sighting target, at least one of said plurality of said sections having a plurality of sets of coupling means, and an adjacent one of the sections having engaging means for engaging with one of the coupling means in one of the set, each coupling means in each set of coupling means being spaced apart by a prescribed distance, the prescribed distance between coupling means in one set of coupling means being different to the prescribed distance between coupling means in another of the sets of coupling means, and wherein upon relative movement of the at least one section and adjacent section one coupling means on the at least one section can be coupled with the engaging means on the adjacent section and wherein said plurality of sections are rotatable relative to one another to enable the engaging means to engage with a coupling means in any of the sets of coupling means.

2. The stepping staff of claim 1, wherein each coupling means comprises a recess and the engaging means is a collar which supports a loaded ball which engages with a recess on the sections to couple the sections together.

3. The stepping staff of claim 2, wherein the plurality of sets of coupling means have their recesses spaced apart by different prescribed distance.

4. A stepping staff having a plurality of sections coupled together for telescopic movement relative to each other, a first section of said plurality of sections having a first collar mounted thereon, a second section of said plurality of sections having a plurality of sets of substantially vertically aligned coupling members spaced about said second section, said first collar supporting a first engaging member which is engagable with a coupling member in anyone of said sets of coupling members, said second section being rotatable about its longitudinal axis relative to said first collar so that the first engaging member can be brought into engagement with said coupling member in one of the sets of coupling members, and said first and second sections can be telescopically moved relative to one another to locate the engaging member in another of the coupling members in said one of said sets to adjust the height of the stepping staff by an incremental distance.

5. A stepping staff according to claim 4, wherein said second section has a second collar mounted thereon, said second collar having locking means for locking said second collar to said second section so that the second collar can be either fixed relative to the second section or rotated about the axis of the second section relative to the second section, a third section of said plurality of sections being located adjacent to said second section, said third section having a plurality of sets of coupling members, said second collar having a second engaging member for engaging any one of the coupling members on the third section, and wherein said second collar is rotatable with the first and the second sections relative to the third section to locate said second engaging member with the set of coupling members on the third section corresponding to the coupling members engaged by the first engaging member on the second section, and said second collar and the third section are rotatable relative to the first and second sections to bring the set of engaging members on the second section into alignment with those in the third section, said second and third section being telescopically movable to engage the second engaging member in another coupling member in the set of coupling members on the third section to further incrementally adjust the height of the staff.

6. The stepping staff according to claim 5, wherein said first and second engaging members are screw threaded members received in screw threaded holes in the first and second collars, said screw threaded members having a spring loaded ball and wherein said coupling members are recesses which receive said balls.

7. The stepping staff of claim 5, wherein said coupling members in each set are joined by a groove.

8. The stepping staff of claim 5, wherein said second section has a groove about its periphery which is provided with locking recesses in alignment with each set of engaging members, the locking means having a spring loaded ball which is locatable in one of the locking recesses to lock the second collar to the second section, said spring loaded ball being movable out of the locking recess in the said groove to allow the collar to rotate relative to the second section.

9. The stepping staff according to claim 4, wherein one of said sections includes a sighting target.

10. The stepping staff according to claim 4, wherein each coupling member in each set of coupling members is joined by a groove and each groove is colour coded for easy recognition.

11. The stepping staff according to claim 4, wherein said first engaging member is arranged for limited movement with respect to said sections such that said first engaging member cannot be completely disengaged from said coupling members, a retaining member joining a coupling member in each set of coupling members such that the engaging member must be located in one of the coupling members which are joined by the retaining member so that the limited outward movement of the engaging member is sufficient to allow the first engaging member to enter the retaining means so that said second section can be rotated relative to the first collar.

12. A stepping staff according to claim 11, wherein said engaging member comprises a block and a ball member, the coupling members comprise recesses and the retaining member comprises a groove, which is shallower than said recesses, biasing means disposed between the block and the ball member for forcing said ball portion into engagement with the groove and recesses, the distance between said block and said ball member being such that said ball member is not able to be completely withdrawn from said recesses but can be withdrawn from said recesses a sufficient distance to enable the ball portion to locate in said groove.

* * * * *